(12) United States Patent
Gale et al.

(10) Patent No.: US 9,132,741 B2
(45) Date of Patent: Sep. 15, 2015

(54) METHOD AND SYSTEM FOR CONTROLLING CURRENT FLOW THROUGH A POWER DISTRIBUTION CIRCUIT

(75) Inventors: Allan Roy Gale, Livonia, MI (US); Michael W. Degner, Novi, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 12/575,544

(22) Filed: Oct. 8, 2009

(65) Prior Publication Data

US 2011/0084548 A1   Apr. 14, 2011

(51) Int. Cl.
| | | |
|---|---|---|
| *B60L 1/00* | (2006.01) | |
| *B60L 3/00* | (2006.01) | |
| *H02G 3/00* | (2006.01) | |
| *B60L 11/18* | (2006.01) | |

(52) U.S. Cl.
CPC .............. *B60L 11/1816* (2013.01); *B60L 1/00* (2013.01); *B60L 3/0069* (2013.01); *Y02T 10/7005* (2013.01); *Y02T 90/14* (2013.01)

(58) Field of Classification Search
CPC . Y02T 10/7005; Y02T 10/7077; B60R 16/03; B60R 11/14; H02H 3/04; H02H 7/06; H02H 7/122; H02H 3/00; H02H 7/18; H02J 3/14; H02J 7/00; H02J 7/14; H02G 3/00; H01H 1/00
USPC ........... 307/10.1, 125, 66, 39, 63, 43; 361/63, 361/62, 64; 320/107, 108, 109, 134; 324/426, 427, 430
See application file for complete search history.

(56) References Cited

U.S. PATENT DOCUMENTS

| | | | |
|---|---|---|---|
| 4,345,342 A | 8/1982 | Saito | |
| 5,895,988 A * | 4/1999 | Shaffer et al. | 307/126 |
| 6,525,543 B1 * | 2/2003 | Roberts et al. | 324/522 |
| 7,329,966 B2 * | 2/2008 | Konishi | 307/10.1 |
| 7,573,150 B2 * | 8/2009 | Hirasawa | 307/9.1 |
| 8,174,148 B2 * | 5/2012 | Crucs | 307/32 |
| 2002/0125895 A1 * | 9/2002 | Awaji | 324/541 |
| 2003/0048007 A1 * | 3/2003 | Mercier et al. | 307/125 |
| 2005/0269880 A1 * | 12/2005 | Konishi | 307/10.7 |
| 2008/0002322 A1 * | 1/2008 | Hirasawa | 361/79 |
| 2008/0311877 A1 | 12/2008 | Darshan | |
| 2009/0102433 A1 | 4/2009 | Kamaga | |
| 2009/0167457 A1 * | 7/2009 | Melde et al. | 333/32 |
| 2009/0198459 A1 | 8/2009 | Bilac et al. | |
| 2010/0019734 A1 | 1/2010 | Oyobe et al. | |

(Continued)

OTHER PUBLICATIONS

James P. Noon et al., UC3855A/B High Performance Power Factor Preregulator, Unitrode Corporation, U-153, pp. 1-20, 1999.

(Continued)

*Primary Examiner* — Rexford Barnie
*Assistant Examiner* — Jagdeep Dhillon
(74) *Attorney, Agent, or Firm* — David B. Kelley; Brooks Kushman P.C.

(57) ABSTRACT

An automotive vehicle capable of receiving power from a power distribution circuit including a power line and return line includes a controller disposed within the vehicle. The controller is configured to be electrically connected with the power distribution circuit, determine a difference between a resistance of the power line and a resistance of the return line, and control a current flow through the distribution circuit based on the determined difference.

9 Claims, 5 Drawing Sheets

(56) References Cited

U.S. PATENT DOCUMENTS

| | | |
|---|---|---|
| 2010/0131137 A1 | 5/2010 | Iida |
| 2010/0134065 A1 | 6/2010 | Iida |
| 2010/0188051 A1 | 7/2010 | Yamazaki et al. |
| 2010/0194354 A1 | 8/2010 | Gotou et al. |
| 2010/0198440 A1 | 8/2010 | Fujitake |
| 2010/0231174 A1 | 9/2010 | Li et al. |
| 2010/0253145 A1 | 10/2010 | King et al. |
| 2011/0127956 A1 | 6/2011 | Mitsutani |

OTHER PUBLICATIONS

Yijing Chen, et al, Control of a Single-Phase PFC Preregulataor [sic] Using an 8-Bit Microcontroller, pp. 1454-1460, 1-4244-0714-1/07, 2007, IEEE.

James P. Noon, A 250kHz, 500W Power Factor Correction Circuit Employing Zero Voltage Transitions, Unitrode Corporation, pp. 1-1 to 1-16, Oct. 1994, Texas Instruments Incorporated.

* cited by examiner

METHOD AND SYSTEM FOR CONTROLLING CURRENT FLOW THROUGH A POWER DISTRIBUTION CIRCUIT

BACKGROUND

A power cable is an assembly of two or more electrical conductors, usually held together with a sheath. The assembly may be used for transmission of electrical power. Power cables may be installed, for example, as permanent wiring within buildings, buried in the ground, run overhead or exposed. Flexible power cables may be used for portable devices, mobile tools and machinery.

Cables may include three major components: conductors, insulation and protective jacketing. The makeup of individual cables may vary according to application. The construction and material may be determined by the working voltage, current-carrying capacity and environmental conditions.

Power cables may use stranded copper or aluminum conductors. Some cables may include un-insulated conductors for circuit neutral or ground (earth) connection.

The overall assembly may be round or flat. Non-conducting filler strands may be added to the assembly to maintain its shape. Special purpose power cables for overhead or vertical use may have additional elements such as steel or Kevlar structural supports.

Common types of general-purpose cables are regulated by national and/or international codes. These codes define the various wire alloys that may make up a cable, its insulation type, and characteristics including its resistance to chemicals and sunlight.

Commonly-used power cables may contain an un-insulated bare wire for connection to earth ground. Three prong power outlets and plug-cords require a grounding wire. Extension cables often have an insulated grounding wire.

ROMEX is a cable made of solid copper wires with a nonmetallic plastic jacket containing a waxed paper wrapped inner group of at least a pair of 600 volt THWN plastic insulated service wires and a bare ground wire. A common ROMEX cable may thus have three wires: a neutral wire (colored white), a wire providing power to the load (colored black) and a bare grounding wire.

Another common ROMEX variant has a neutral, identified by white coloring, two phase wires: a first conductor (black) and a second conductor (usually red), and an un-insulated copper grounding wire. This type may be generally used for multiple switching locations of a common or shared lighting arrangement, such as for switches located at either end of a hallway, or on both upper and lower floors for stairway lighting.

SUMMARY

A method for controlling a current flow through a power distribution circuit including a power line and return line includes determining a difference between a resistance of the power line and a resistance of the return line, and controlling a current flow through the distribution circuit based on the determined difference.

An automotive vehicle capable of receiving power from a power distribution circuit including a power line and return line includes a controller disposed within the vehicle. The controller is configured to be electrically connected with the power distribution circuit, determine a difference between a resistance of the power line and a resistance of the return line, and control a current flow through the distribution circuit based on the determined difference.

A battery charger including controller circuitry is capable of receiving power from a power distribution circuit including a power line and return line, and transferring the power to a battery. The controller circuitry is configured to determine a difference between a resistance of the power line and a resistance of the return line, and to control current flow through the distribution circuit based on the determined difference.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
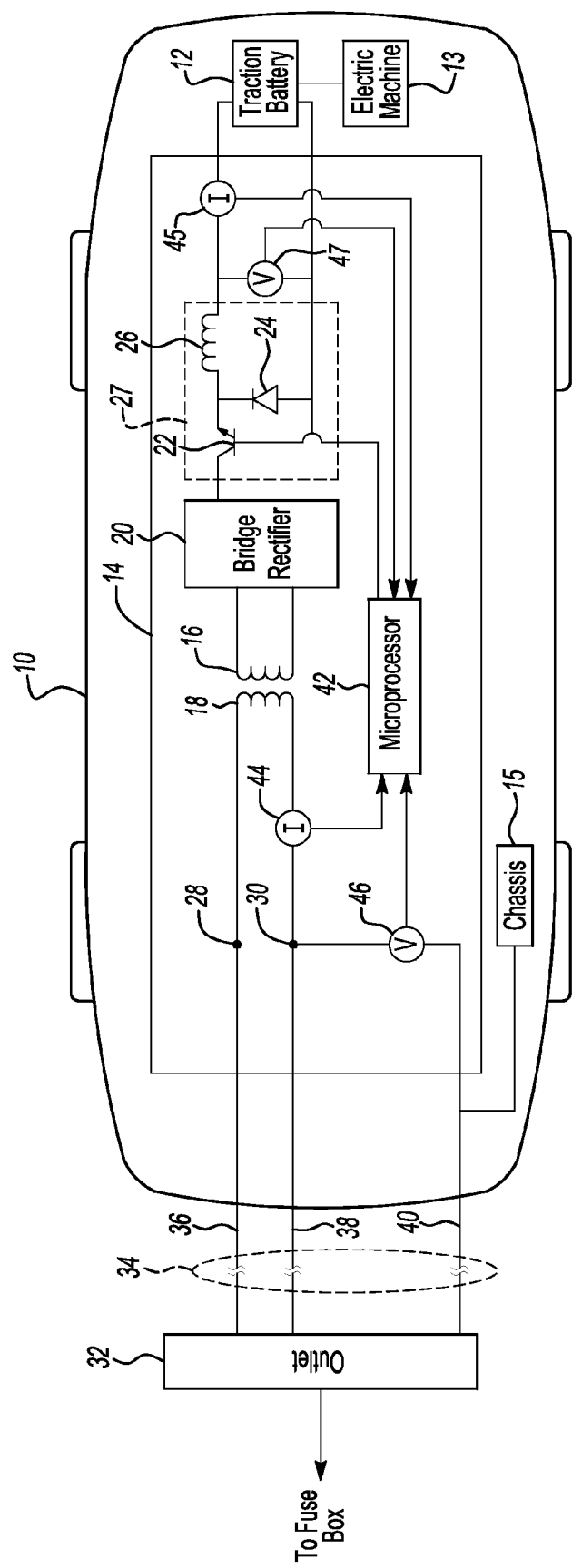
FIG. 1 is a schematic diagram of an embodiment of an automotive vehicle.

Referring now to FIG. 1, an embodiment of an automotive vehicle 10, e.g., hybrid electric, electric, etc., includes a traction battery 12, electric machine 13, battery charger 14 and chassis 15. As apparent to those of ordinary skill, the traction battery 12 may provide motive power for the vehicle 10 via the electric machine 13.

The battery charger 14 may include a pair of coils 16, 18, a bridge rectifier 20, transistor 22, diode 24 and inductor 26. As apparent to those of ordinary skill, the transistor 22, diode 24 and inductor 26 form a buck regulator 27 and may be used to regulate the current from the bridge rectifier 20 to the traction battery 12.

The coil 18 includes a power terminal 28 and a return terminal 30. The coil 18 may be electrically connected with an electrical outlet 32 via a power cable 34. The electrical outlet 32 of FIG. 1 is a 120 V wall outlet. In other embodiments, the electrical outlet 32 may be a 240 V wall outlet, a multiphase wall outlet, etc. As known in the art, the turns ratio of the coils 16, 18 may depend on the voltages associated with the battery 12 and outlet 32.

The coil 16 may be electrically connected with the traction battery 12 through the bridge rectifier 20, transistor 22 and inductor 26. As known in the art, the bridge rectifier 20 (or diode bridge) may be an arrangement of four diodes in a bridge configuration. This arrangement may provide the same polarity of output voltage for any polarity of input voltage. In this embodiment, the bridge rectifier 20 converts alternating current input into direct current output.

The power cable 34 includes a power line 36, return line 38 and ground line 40. The power line 36 is electrically connected with the power terminal 28. The return line 38 is electrically connected with the return terminal 30. The ground line 40 is electrically connected with the chassis 15. In the embodiment of FIG. 1, the power line 36 delivers current from the outlet 32 to the coil 18 and the return line 38 delivers current from the coil 18 to the outlet 32.

The battery charger 14 may also include a microprocessor 42, current sensors 44, 45 and voltage sensors 46, 47. The microprocessor receives current and voltage information from the current sensors 44, 45 and voltage sensors 46, 47. In the embodiment of FIG. 1, the current sensor 44 senses current through the coil 18 and return terminal 30 and the voltage sensor 46 senses voltage between the return terminal 30 and ground line 40. The current sensor 45 senses current to the traction battery 12 and the voltage sensor 47 senses voltage across the traction battery 12. Other arrangements, however, are also possible. As an example, the voltage sensor 46 may be positioned to sense voltage between the power terminal 28 and return terminal 30. As another example, the current sensor 44 and/or voltage sensor 46 may be positioned to sense current and/or voltage between the bridge rectifier 20 and transistor 22. Other configurations are also contemplated.

The microprocessor 42 may determine a change in temperature of the power and/or return lines 36, 38 based on, for example, the current and voltage measured by the current and voltage sensors 44, 46. The instantaneous resistance, R, of a wire having a temperature coefficient of resistance, α, may be related to a change in temperature, ΔT, of the power and/or return lines 36, 38 by the following relation:

$$R_i(1 + \alpha \Delta T) \tag{1}$$

or $$\Delta T = \frac{\Delta R}{\alpha R_i} \tag{2}$$

where $R_i$ is the initial resistance of the wire. In terms of voltages and currents, equation (2) may be rewritten as $$\Delta T = \left(\frac{V}{I} - \frac{V_i}{I_i}\right)\left(\frac{I_i}{V_i}\right)\left(\frac{1}{\alpha}\right) \tag{3}$$

or $$\Delta T = \left(\frac{V I_i}{V_i I} - 1\right)\left(\frac{1}{\alpha}\right) \tag{4}$$

where I and V are the instantaneous current and voltage measured respectively by the sensors 44, 46, and $I_i$ and $V_i$ are the initial current and voltage measured respectively by the sensors 44, 46. Based on equation (4), the microprocessor 42 may determine a change in temperature of the power and/or return lines 36, 38 based on the current and voltage measured by the current and voltage sensors 44, 46. In other embodiments, the battery charger 14 may control, in a known fashion, the current flow through it to keep it generally constant. Thus, the microprocessor 42 may determine a change in temperature of the power and/or return lines 36, 38 based only on the voltage measured by the voltage sensor 46. In still other embodiments, the microprocessor 42 may determine a change in temperature of the power and/or return lines 36, 38 based on the voltage measured between the power terminal 28 and return terminal 30.

As apparent to those of ordinary skill (using the notation described above), $$R_i = \frac{V_{LN}^- - V_{LN_i}^+}{2I} \tag{5}$$

and $$R = \frac{V_{LN}^- - V_{LN}^+}{2I} \tag{6}$$

or $$R = \frac{V_{NG}^- - V_{NG_i}^+}{I} \tag{7}$$

where $V_{LN}^-$ is the instantaneous voltage between the power terminal 28 and return terminal 30 just before current begins passing through the battery charger 14, $V_{LNi}^+$ is the instantaneous voltage between the power terminal 28 and return terminal 30 just after current begins passing through the battery charger 14, $V_{LN}^+$ is the instantaneous voltage between the power terminal 28 and return terminal 30 at any time after current begins passing through the battery charger 14, $V_{NG}^-$ is the instantaneous voltage between the return terminal 30 and the ground line 40 just before current begins passing through the battery charger 14 and $V_{NGi}^-$ is the instantaneous voltage between the return terminal 30 and the ground line 40 just after current begins passing through the battery charger 14.

Substituting equations (5) and (6) into equation (2) (and simplifying) yields $$\Delta T = \left(\frac{V_{LN}^- - V_{LN}^+}{V_{LN}^- - V_{LNi}^+} - 1\right)\left(\frac{1}{\alpha}\right) \tag{8}$$

Based on equation (8), the microprocessor 42 may thus determine a change in temperature of the power and/or return lines 36, 38 based on the voltage measured between the power terminal 28 and return terminal 30.

Alternatively, a temperature or change in temperature of the power and/or return lines 36, 38 may be determined in any suitable fashion. For example, temperature sensors, e.g., Wheatstone bridge, diode junction, etc., in communication with the microprocessor 42 and connected with the power and/or return lines 36, 38 may detect and communicate the temperature of the power and/or return lines 36, 38 to the microprocessor 42.

The microprocessor 42 may turn on and turn off the transistor 22 to control the flow of current to the traction battery 12. The microprocessor 42 may thus control the flow of current through the power and/or return lines 28, 30 via the transistor 22.

The power, $P_{in}$, into the coil 18 is equal to the power, $P_{out}$, out of the coil 16 (assuming negligible losses):

$$P_{in} = P_{out} \tag{9}$$

In terms of currents and voltages, equation (9) may be rewritten as $$(I_{rms} V_{rms}) \cos \Theta = I_{BAT} V_{BAT} \tag{10}$$

where $I_{rms}$ and $V_{rms}$ are the root mean square current into and root mean square voltage across the coil 18 respectively, $I_{BAT}$ and $V_{BAT}$ are the current into and voltage across the traction battery 12 (the current and voltage measured by sensors 45, 47 respectively), and Cos θ is the phase angle between $I_{rms}$ and $V_{rms}$. (As apparent to those of ordinary skill, Cos θ is typically equal to 1 in systems with unity power factor correction. Further, when measuring the line to neutral voltage and the neutral to ground voltage, θ is the phase angle between these two AC voltages.) Assuming $V_{rms}$ and $V_{BAT}$ are generally constant and according to equation (10), changes in $I_{BAT}$ will result in changes to $I_{rms}$. That is, decreasing the duty cycle of the transistor 22 to reduce $I_{BAT}$ will reduce $I_{rms}$. (The microprocessor 42 may thus also determine a change in temperature of the power and/or return lines 36, 38 based on the current and voltage measured by the current sensor 44, 45 and voltage sensor 47. For example, equation (10) may be rearranged to solve for $V_{rms}$ and substituted into (8)).

To maintain the temperature of the power and/or return lines 28, 30 within a desired range, the microprocessor 42 may begin to cycle the transistor 22, in a known manner, as the temperature and/or change in temperature of the power and/or return lines 28, 30 begins to approach an upper end of the range. For example, the microprocessor 42 may begin to cycle the transistor 42 to reduce the current flow if the change in temperature of the power and/or return lines 28, 30 exceeds 35 degrees C. Alternatively, the microprocessor 42 may begin to cycle the transistor 42 to reduce the current flow if the temperature of the power and/or return lines 28, 30 is within 7 degrees C. of the upper end of the range. Any suitable control scheme, however, may be used.

As illustrated, the charger 14 is integrated with the vehicle 10. In other embodiments, however, the charger 14 may be remote from the vehicle 10. For example, the charger 14 may be a stand alone unit that may be plugged into the electrical outlet 32 and vehicle 10. Other arrangements are also possible.

Figure 2:
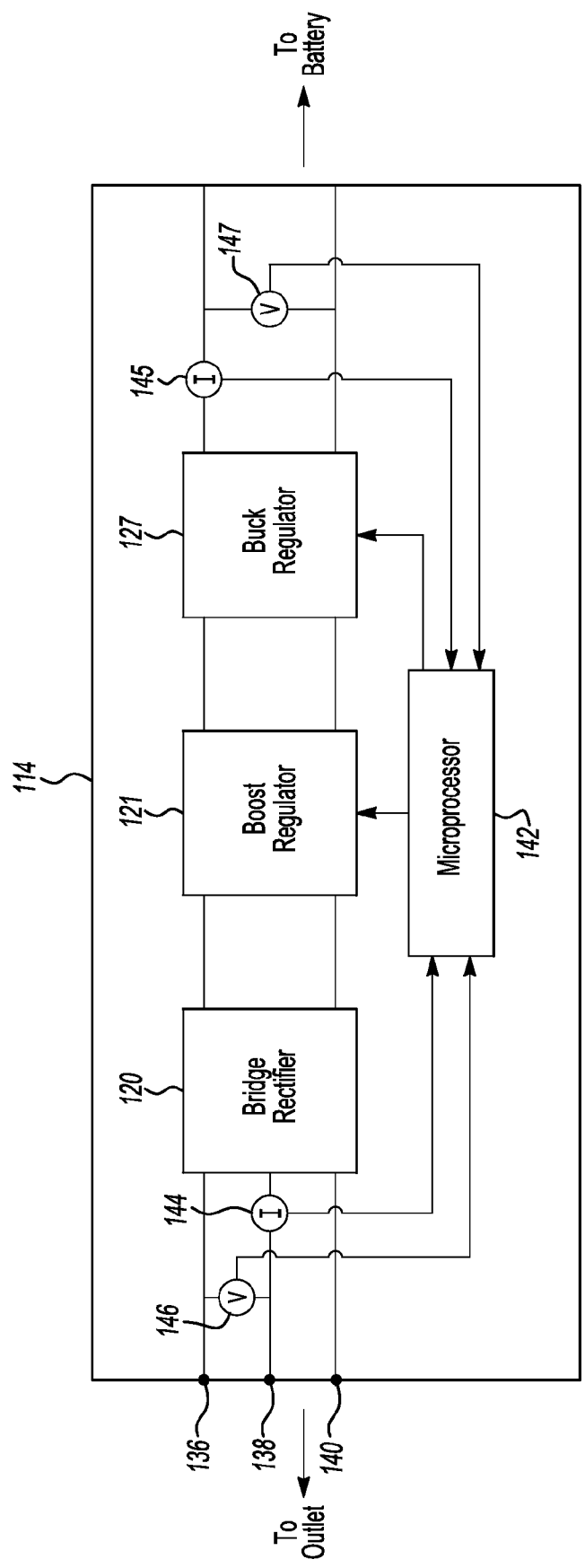
FIG. 2 is a schematic diagram of an embodiment of a battery charger.

Referring now to FIG. 2, numbered elements that differ by 100 relative to numbered elements of FIG. 1 have similar descriptions to the numbered elements of FIG. 1. An embodiment of a battery charger 114 includes a bridge rectifier 120, boost regulator 121, buck regulator 127 and microprocessor 142. The bridge rectifier 120 is electrically connected with the boost regulator 121. The boost regulator 121 is electrically connected with the buck regulator 127. The microprocessor 142 may control the boost and buck regulators 121, 127. The circuitry of the bridge rectifier 120, boost regulator 121 and buck regulator 127 may take any suitable form.

The bridge rectifier 120 may be electrically connected with an electrical power outlet and convert alternating current input into direct current output. As apparent to those of ordinary skill, the microprocessor 142 may control the boost regulator 121, in a known fashion, to regulate the direct current output by the bridge rectifier 120 for power factor correction. Based on current and/or voltage measurements by the sensors 144, 146, the microprocessor 142 may control the buck regulator 127, using techniques similar to those described above, for power distribution temperature management. Of course, other arrangements and/or configurations are also possible.

Figure 3:
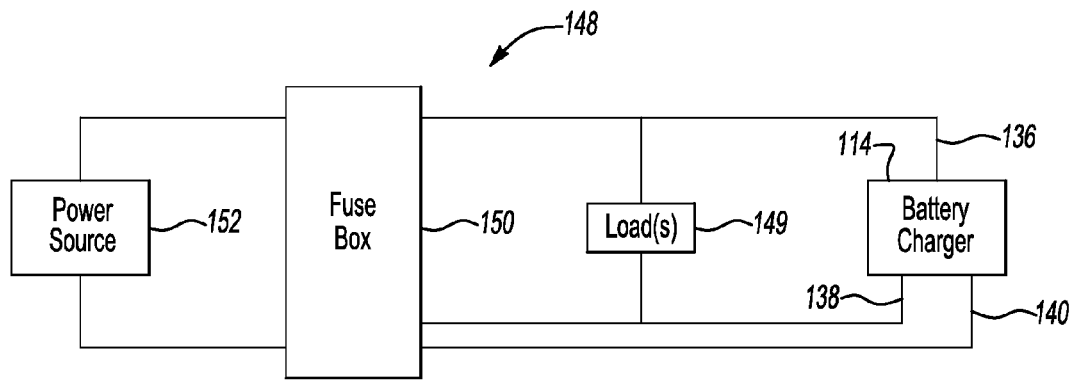
FIG. 3 is a schematic diagram of an example electrical circuit including the battery charger of FIG. 2.

Referring now to FIG. 3, the battery charger 114 has been electrically connected to a circuit 148 including a load 149 (unknown load), fuse box 150, and power source 152. The load 149 (such as a compressor for a refrigerator) is located between the battery charger 114 and fuse box 150 (similar, for example, to those commonly found in residential buildings). As apparent to those of ordinary skill, electrical power from the power source 152 is provided to the battery charger 114 via the fuse box 150.

As explained below, the presence of the unknown load 149 may affect the rate at which the battery charger 114 may pull current from the circuit 148. The following describes techniques for determining the loading capability of the example circuit 148. Once this loading capability has been determined, current may be pulled from the circuit 148 at a maximum rate that will not exceed the capability of the wiring of the circuit 148 or trip fuses associated with the wiring of the circuit 148.

Figure 4:
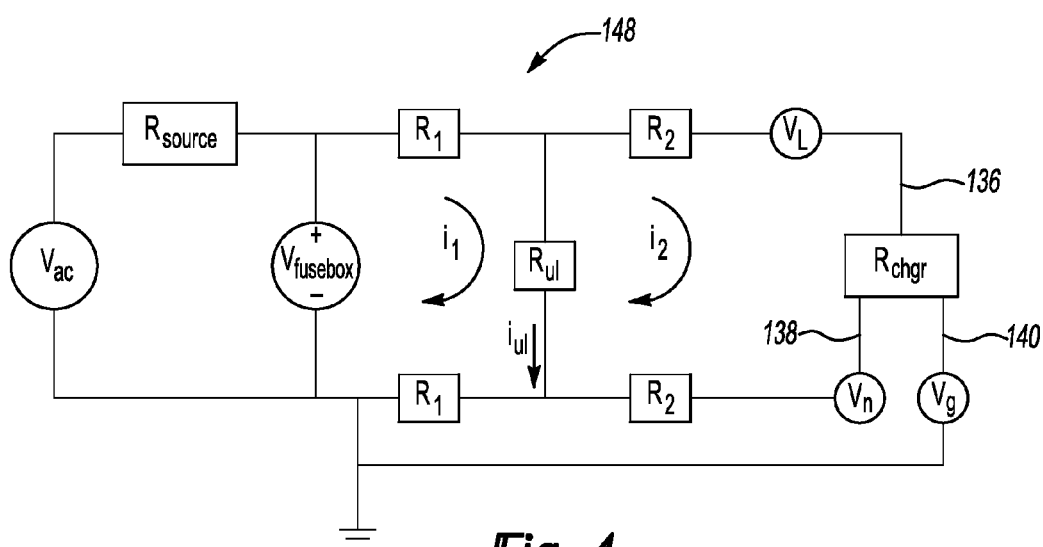
FIG. 4 is an alternative representation of the electrical circuit of FIG. 3.

Referring now to FIG. 4, the circuit 148 may be redrawn to show its various resistances, currents and voltages where $R_1$ is the resistance of the wire between the fuse box 150 and the load 149, $R_2$ is the resistance of the wire between the load 149 and the battery charger 114, $R_{ul}$ is the resistance of the load 149, $R_{Chgr}$ is the resistance of the battery charger 114, $R_{source}$ is the resistance of the power source 152, $V_{ac}$ is the voltage of the power source 152, $V_{fusebox}$ is the voltage across the fuse box 150, $V_l$ is the voltage of the power line 136, $V_n$ is the voltage of the return line 138, $V_g$ is the voltage of the ground line 140, $i_2$ is the current flowing through the battery charger 114, $i_{ul}$ is the current flowing through the load 149, and $i_1$ is the current flowing to the fuse box 150.

Referring now to FIGS. 3 and 4, the characteristics of the circuit 148 may be determined by measuring the three voltages: $V_l$, $V_n$ and $V_g$, and also the charger current $i_2$ in any known fashion. From Kirchhoff's Law (assuming the resistances, $R_1$, of the conductors between the fuse box 150 and unknown load 149 are the same and the resistances, $R_2$, of the conductors between the unknown load 149 and battery charger 114 are the same), $$Vac = i_1 * (R_{source} + 2R_1 + R_{ul}) - i_2 * R_{ul}, \quad (11)$$

$$0 = i_2 * (2R_2 + R_{Chgr} + R_{ul}) - i_1 * R_{ul}, \quad (12)$$

$$V_{ng} = i_1 * R_1 + i_2 * R_2, \text{ and} \quad (13)$$

$$0 = i_1 - i_2 - i_{ul} \quad (14)$$

The maximum current rating and maximum wire resistance may additionally be used to evaluate the characteristics of the circuit 148. As an example, 14G wire has a current rating of 15 A, and 12G wire has a current rating of 20 A. Additionally, 14G wire has a wire resistance of 2.54Ω/1000 ft, and 12G wire has a wire resistance of 1.59Ω/1000 ft. Assuming a brown-out condition of 80 V or less at the wall outlet, a reasonable maximum wire resistance would be that wire resistance necessary to reduce the voltage at $R_{Chgr}$ to 80 V when 15 A is drawn by the charger 114 and 0 A is drawn by the unknown load 149. This would require 20 V to be dropped across each set of resistors $R_1$ and $R_2$. Knowing that V=IR, $R_1+R_2$ should be less than 1.3Ω. This resistance may be even less. Otherwise, ⅓ of the power from the fuse box 150 may be dissipated in the wiring of the circuit 148.

Evaluating a typical home may illustrate how much less resistance is reasonable. Considering an 1800 ft² ranch that is 30 ft deep by 60 ft long, 90 ft (or less) of wire would be required to reach corner to corner in this home. In this case, $R_1+R_2$ is equal to (or less than) 0.23Ω for 14G wire.

The load resistance required to draw 15 A from a 120V line is 120 V/15 A or 8Ω. Any lower load resistance would result in a current exceeding 15 A when connected directly to the 120V, i.e., $R_1+R_2=0$. When comparing the minimum load resistance, e.g., 8Ω, to the wire resistance, e.g., 0.23Ω, the load resistance is much greater. Therefore, an assumption that $i_{ul}$ remains constant independent of charger loading may be made. To check this assumption, consider 14G wire and 90 ft of wire length between the unknown load 149 and fuse box

Figure 5:
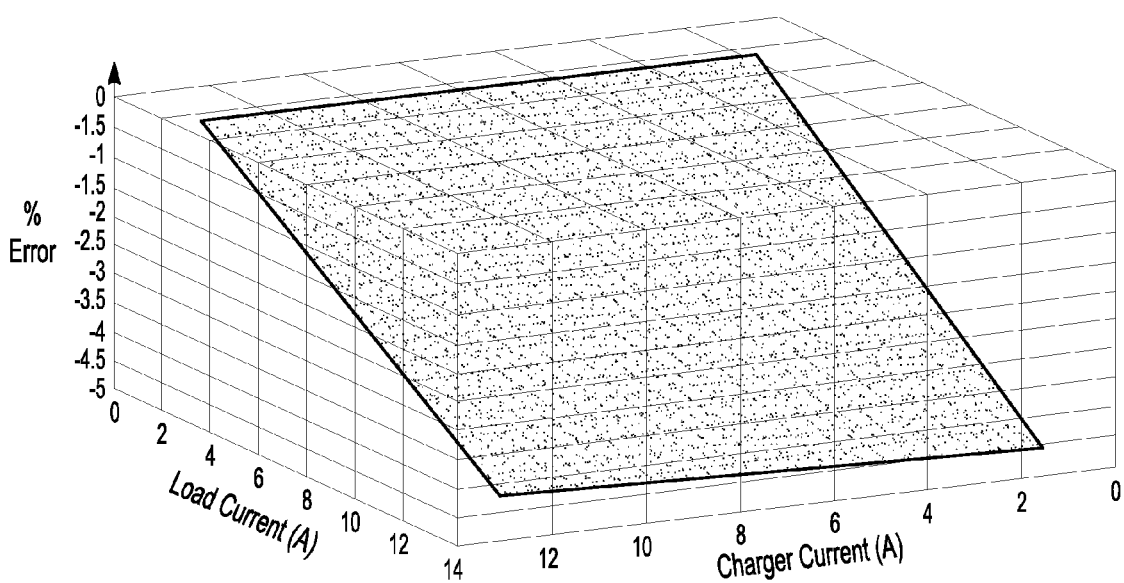
FIG. 5 is an example plot of percent change in load current due to charger current in the electrical circuit of FIG. 4.

150. FIG. 5 shows the percent change in $i_{ul}$ over a range of values of $i_2$. The load current, $i_{ul}$, varies by less than 5%.

From (11), (12) and (13)

$$i_{ul} = \frac{V_{ac}}{R_{ul}} \frac{1}{1 + \frac{2R_1}{2R_2 + R_{ul}} + \frac{2R_1}{R_{ul}}} \quad (15)$$

If $i_{ul}$ is constant for the reasons explained above, (15) reduces to $$i_{ul} = \frac{V_{ac}}{R_{ul}} \quad (16)$$

(16) is approximately equal to (15) for conditions where $R_1 \ll R_{ul}$ and/or $R_{Chgr}$ is large.

Solving for $R_{source}$ (Assuming $V_{ac}$ does not Change with Load)

$$V_{fusebox} = V_{ac} - (i_1) * R_{source}, \quad (17)$$

and $$V_{fusebox} = V_{ln} + 2V_{ng} \quad (18)$$

where $$V_{ln} = V_l - V_n \quad (19)$$

and $$V_{ng} = V_n - V_g \quad (20)$$

Figure 6:
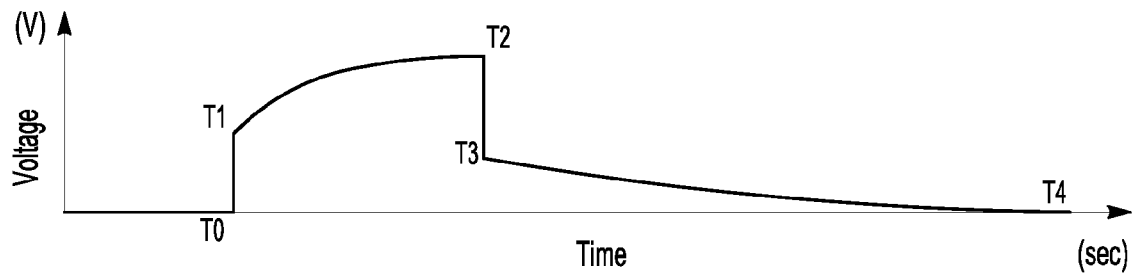
FIG. 6 is an example plot of the voltage between the return and ground lines of FIG. 3 versus time as the battery charger of FIG. 3 is turned on and off.

Referring now to FIGS. 3, 4 and 6, $i_2 = 0$ at T0 (i.e., just before the charger 114 is turned on), and $i_2 > 0$ at T1 (i.e., just after the charger 114 is turned on). The values of $V_{ln0}$, $V_{ng0}$ (i.e., the voltage drops between the power and return lines 136, 138 and return and ground lines 138, 140, respectively at T0), $V_{ln1}$, $V_{ng1}$ (i.e., the voltage drops between the power and return lines 136, 138 and return and ground lines 138, 140, respectively at T1), and $i_2$ can be measured at the charger 114 by first solving (17) with $i_2 = 0$ and then subtracting from it (17) when $i_2 > 0$.

The following equation is obtained from (14) and (17)

$$V_{fusebox_0} - V_{fusebox_1} = V_{ac} - (i_{ul} + 0) * R_{source} - (V_{ac} - (i_{ul} + i_2)) * R_{source} \quad (21)$$

Combining (18) and (21) results in $$R_{source} = \frac{(Vl_{n_0} + 2V_{ng_0}) - (V_{ln_1} + 2V_{ng_1})}{i_{2_1}} \quad (22)$$

Solving for the Wire Resistance $R_1 + R_2$ (Assuming $i_{ul}$ is Constant)

(13) can be solved for the conditions of $i_2 = 0$ and $i_2 > 0$. For $i_2 = 0$ at T0, (13) and (14) reduce to $$V_{ng_0} = i_{ul} * R_1 \quad (23)$$

For $i_2 > 0$ at T1, (13) with (14) can be rewritten as $$V_{ng_1} = (i_{ul} + i_2) * R_1 + i_2 * R_2 \quad (24)$$

Subtracting (24) from (23) yields $$(V_{ng_1} - V_{ng_0})|_{ul_{constant}} = i_2 * R_T \quad (25)$$

where $$R_T + R_1 + R_2 \quad (26)$$

Solving for the wire resistance yields $$R_1 + R_2 = \frac{V_{ng_1} - V_{ng_0}}{i_2} \quad (27)$$

Solving for the Wire Resistance $R_1$

A relationship between $R_1$ and $R_2$ may be obtained to determine the value of $i_{ul}$. This may be achieved by considering the thermal heating of wire in the circuit 148 caused by the power it dissipates when an additional load from the charger 114 is applied.

Figure 7:
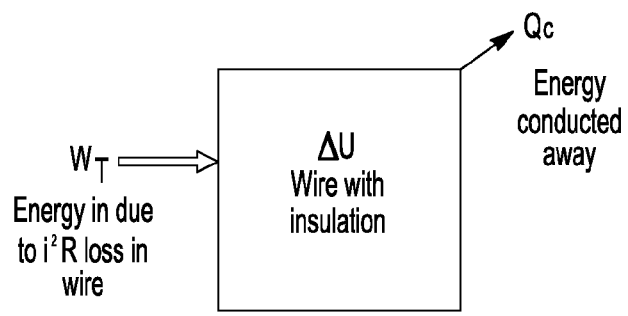
FIG. 7 is a thermodynamic model of a wire in the electrical circuit of FIG. 4.
Figure 8:
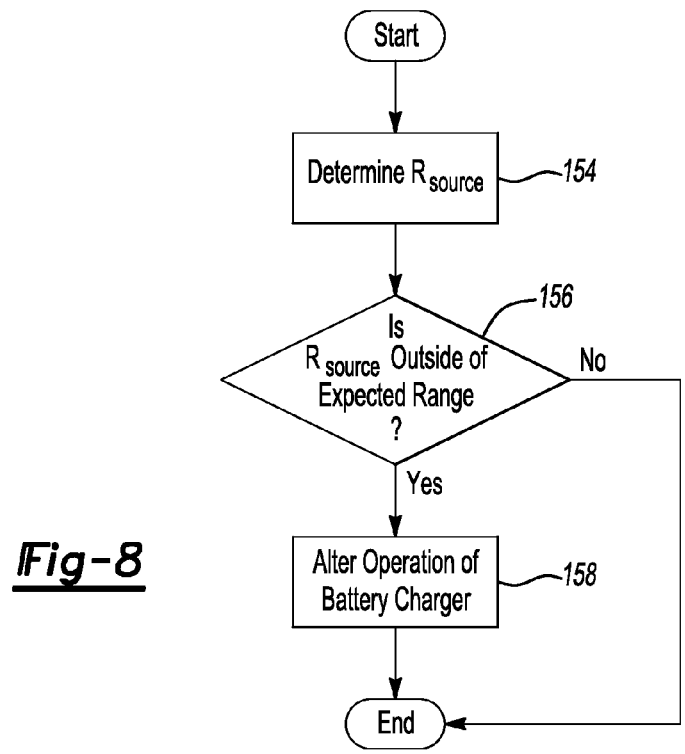
FIG. 8 is a flow chart of an example algorithm for controlling current flow through the electrical circuit of FIGS. 3 and 4.
Figure 9:
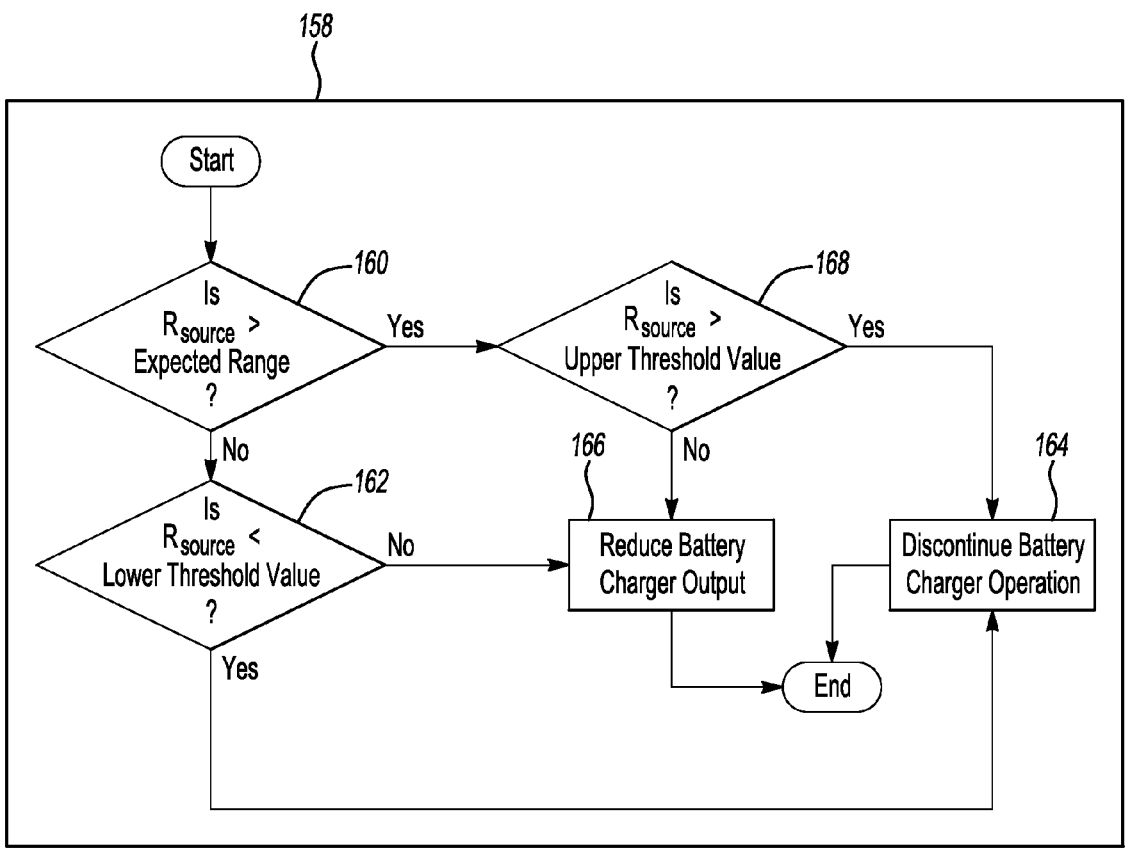
FIG. 9 is a flow chart of an expanded portion of the example algorithm of FIG. 8.

Referring now to FIG. 7, the energy, $W_T$, in the entire wire length (the length associated with $R_1$ and $R_2$) due to the added charger current is $$W_T = W_{R1} + W_{R2} = \int R_1 (i_{ul} + i_2)^2 dt + \int R_2 * i_2^2 dt \quad (28)$$

where $W_{R1}$ and $W_{R2}$ are the respective energies in the wires associated with $R_1$ and $R_2$.

The energy change, $\Delta U$, in the entire wire length is $$\Delta U = (cm_1 \Delta T_1 - Q_{c_{R1}}) + (cm_2 \Delta T_2 - Q_{c_{R2}}) = \int R_1 (i_{ul} + i_2)^2 dt + \int R_2 * i_2^2 dt - Q_{c_{R1}} - Q_{c_{R2}} \quad (29)$$

where $m_1$, $m_2$, $\Delta T_1$ and $\Delta T_2$ are the mass and change in temperature, respectively, of the wire lengths denoted by $R_1$ and $R_2$, c is the specific heat capacity of the wire lengths, and Q is the heat applied.

Additionally, $$\Delta T_1 = \frac{\int R_1 (i_{ul} + i_2)^2 dt - Q_{c_{R1}}}{cm_1} \text{ and} \quad (30)$$

$$\Delta T_2 = \frac{\int R_2 (i_2)^2 dt - Q_{c_{R2}}}{cm_2}$$

When wire is heated, its resistance changes as explained with reference to (1) and (2). (30) can thus be written in terms of R:

$$\Delta R_1 = \frac{\alpha R_1}{cm_1} \left( \int R_1 (i_{ul} + i_2)^2 dt - Q_{c_{R1}} \right) \text{ and} \quad (31)$$

$$\Delta R_2 = \frac{\alpha R_2}{cm_2} \left( \int R_2 (i_2)^2 dt - Q_{c_{R2}} \right)$$

The change in voltage drop across $R_1$ and $R_2$ is $\Delta V = \Delta R * I$ or $$\Delta V_1 = \frac{\alpha R_1}{cm_1} \left( \int R_1 (i_{ul} + i_2)^2 dt - Q_{c_{R1}} \right) * (i_{ul} + i_2) \text{ and} \quad (32)$$

$$\Delta V_2 = \frac{\alpha R_2}{cm_2} \left( \int R_2 (i_2)^2 dt - Q_{c_{R2}} \right) * i_2$$

Expanding $\Delta V_1$ yields $$\Delta V_1 = \frac{\alpha R_1}{cm_1}\left(\int R_1(i_{ul}^2 + 2i_{ul}*i_2 + i_2^2)dt - Q_{c_{R1}}\right)*(i_{ul}+i_2) \quad (33)$$

Evaluating the ratio of $\Delta V_T$ to $\Delta V_{R1}$ yields $$\frac{\Delta V_T}{V_1} = \frac{\Delta V_1 + \Delta V_2}{\Delta V_1} \quad (34)$$

$$= \frac{\frac{\alpha R_1}{cm_1}\left(\int R_1(i_{ul}^2 + 2i_{ul}*i_2 + i_2^2)dt - Q_{c_{R1}}\right)*(i_{ul}+i_2) + \frac{\alpha R_2}{cm_2}\left(\int R_2(i_2^2)dt*(i_2) - Q_{c_{R2}}\right)*i_2}{\frac{\alpha R_1}{cm_1}(\int R_1(i_{ul}^2 + 2i_{ul}*i_2 + i_2^2)dt - Q_{c_{R1}})*(i_{ul}+i_2)}$$

As known to those of ordinary skill, the mass, m, of a wire is related to its area, A, and length, l, by $$m = \zeta * A * l \quad (35)$$

where $\zeta$ is the density of the metal. As also known to those of ordinary skill, the resistance, R, of a wire is related to its area and length by $$R = \rho * l / A \quad (36)$$

where $\rho$ is the resistivity of the metal.

From (35) and (36) if the area (Gauge) of the wire is constant in the circuit 148 then $$m \alpha R \quad (37)$$

and $$\frac{R_1}{R_T} = \frac{m_1}{m_T} \quad (38)$$

where $m_T = m_1 + m_2$.

Considering (35) and (36), (34) reduces to $$\frac{\Delta V_T}{V_1} = \frac{\Delta V_1 + \Delta V_2}{\Delta V_1} \quad (39)$$

$$= \frac{\left(\int R_1(i_{ul}^2 + 2i_{ul}*i_2 + i_2^2)dt - Q_{c_{R1}}\right)*(i_{ul}+i_2) + \left(\int R_2(i_2^2)dt - Q_{c_{R2}}\right)*(i_2)}{(\int R_1(i_{ul}^2 + 2i_{ul}*i_2 + i_2^2)dt - Q_{c_{R1}})*(i_{ul}+i_2)}$$

$Q_{cR}$ may be written as $$Q_{cR} = kA\frac{\Delta T}{\Delta X} \quad (40)$$

where k is the insulation thermal conductivity of the wire, A is the area of the exposed insulation, $\Delta T$ is the difference between the air and the wire temperature, and $\Delta X$ is the distance between temperature readings. (For this analysis, these terms will be assumed to be small and also reduced in effect when included in both the numerator and denominator of (39). Other implementations may include some empirical compensation for these terms.)

Considering (40), (39) reduces to $$\frac{\Delta V_T}{V_1} = \frac{\Delta V_1 + \Delta V_2}{\Delta V_1} \quad (41)$$

$$= \frac{\left(\int R_1(i_{ul}^2 + 2i_{ul}*i_2 + i_2^2)dt\right)*(i_{ul}+i_2) + \left(\int R_2(i_2^2)dt*(i_2)\right)}{(\int R_1(i_{ul}^2 + 2i_{ul}*i_2 + i_2^2)dt)*(i_{ul}+i_2)}$$

As wire heats up, the wire resistance increases and the current through the wire deceases slightly. For this analysis, the change will be considered small enough to neglect. Additionally the value of $i_2$ may be held constant to simplify (41) to $$\frac{\Delta V_1 + \Delta V_2}{\Delta V_1} \quad (42)$$

$$= \frac{R_1(i_{ul}^2 + 2i_{ul}*i_2 + i_2^2)*(i_{ul}+i_2) + R_2*(i_2^2)*(i_2)}{\int R_1(i_{ul}^2 + 2i_{ul}*i_2 + i_2^2)*(i_{ul}+i_2)}$$

The equation contains unknown terms $R_1$, $R_2$ and $i_{ul}$. If $R_1 \le R_1 + R_2$, then from (27)

$$i_{ul_{min}} \ge \frac{V_{ng0}}{R_1 + R_2} \quad (43)$$

Thus establishing the minimum value of $i_{ul}$ where $$i_{ul} = i_{ul_{min}} * \frac{R_1 + R_2}{R_1} \quad (44)$$

Including (26), (43) and (44) in (42) yields $$\frac{\Delta V_1 + \Delta V_2}{\Delta V_1} = \frac{R_1\left(\left(i_{ul_{min}} * \frac{R_T}{R_1}\right)^2 + 2\left(i_{ul_{min}} * \frac{R_T}{R_1}\right)*i_2 + i_2^2\right)*\left(\left(i_{ul_{min}} * \frac{R_T}{R_1}\right) + i_2\right) + (R_T - R_1)*(i_2^2)*(i_2)}{R_1\left(\left(i_{ul_{min}} * \frac{R_T}{R_1}\right)^2 + 2\left(i_{ul_{min}} * \frac{R_T}{R_1}\right)*i_2 + i_2^2\right)*\left(\left(i_{ul_{min}} * \frac{R_T}{R_1}\right) + i_2\right)} \quad (45)$$

An inspection of (45) shows that the only unknown term is $R_1$. The solution may be computationally intensive and may be better solved by an algorithm that iterates to the correct solution of $R_1$. Alternatively, an additional assumption that $i_{ul}$ existed for a reasonably long time so as to have heated the wire to a constant temperature could be made (this may be confirmed, for example, by measuring $V_{ng0}$ over a period of time to make sure it is not increasing). Using this assumption, (45) reduces to $$\frac{\Delta V_1 + \Delta V_2}{\Delta V_1} = \quad (46)$$

-continued $$\frac{R_1\left(2\left(i_{ul_{min}}*\frac{R_T}{R_1}\right)+i_2\right)*\left(\left(i_{ul_{min}}*\frac{R_T}{R_1}\right)+i_2\right)+(R_T-R_1)*(i_2^2)}{R_1\left(2\left(i_{ul_{min}}*\frac{R_T}{R_1}\right)+i_2\right)*\left(\left(i_{ul_{min}}*\frac{R_T}{R_1}\right)+i_2\right)}$$

The value of $\Delta T/V_1$ may not be measurable while $i_2>0$ so an alternative to (45) is to measure the numerator with $i_2>0$ and the denominator with $i_2=0$. This reduces (45) to $$\frac{V_{ng_2}-V_{ng_1}}{V_{ng_3}-V_{ng_0}}= \tag{47}$$

$$\frac{R_1\left(2\left(i_{ul_{min}}*\frac{R_T}{R_1}\right)+i_2\right)*\left(\left(i_{ul_{min}}*\frac{R_T}{R_1}\right)+i_2\right)+(R_T-R_1)*(i_2^2)}{R_1\left(2\left(i_{ul_{min}}*\frac{R_T}{R_1}\right)+i_2\right)*\left(i_{ul_{min}}*\frac{R_T}{R_1}\right)}$$

where $V_{ng_2}-V_{ng_1}=\Delta V_1+\Delta V_2$ and $V_{ng_3}-V_{ng_0}=\Delta V_1$.
(46) can be solved for R1:

$$R_1 = \frac{2*i_{ulmin}^2*R_T*(V_1-V_0+V_3-V_2)}{i_2*(i_{ulmin}*(3V_0-V_1+V_2-3V_3)+i_2*(V_0-V_3))} \tag{48}$$

where $V_x$ is $V_{ng}$ at $T_x$ of FIG. 6.
Solving for $R_2$
From (26)

$$R_2=R_T-R_1 \tag{49}$$

Solving for $R_{ul}$ and $i_{ul}$

Equation (11) can be used to solve for $R_{ul}$. At T0, $V_{ln}=i_{ul}*R_{ul}$ and $V_{ng}=i_{ul}*R_1$. As a result, $$\frac{V_{ln_0}}{V_{ng_0}} = \frac{R_{ul}}{R_1}, \tag{50}$$

$$R_{ul} = \frac{V_{ln_0}}{V_{ng_0}}*R_1 \tag{51}$$

$$i_{ul} = \frac{V_{ln_0}}{R_{ul}} \tag{52}$$

$m_1$, $m_2$, $R_1$ and $R_2$ may be solved for using (29), (30), (50) and (51). Standard look-up tables, stored for example in memory of the microprocessor 142, may then be used to determine the gauge and thus maximum total current, $i_{max}$, rating of the wiring associated with $R_1$ and $R_2$. The microprocessor 142 may then control $i_2$, using the techniques discussed herein, such that $$i_{max} \leq i_{ul}+i_2 \tag{53}$$

The resistance of the load 149, $R_{ul}$, may, of course, include reactive components. As apparent to those of ordinary skill, these reactive components may be determined by incorporating θ (discussed with reference to (10)) into the appropriate equations above in a known fashion. Any suitable technique, however, may be used.

Referring again to FIGS. 3 and 4, the difference between $V_{ac}$ and $V_l$ (the upper circuit branch resistance) includes the voltage drop across $R_{source}$. The difference between $V_{ac}$ and $V_n$ (the lower circuit branch resistance) does not include the voltage drop across $R_{source}$. $R_{source}$ represents the impedance looking back into the A/C line and has a real value greater than 0. If, however, there is a fault in the lower circuit branch such that its resistance is greater than that of the upper circuit branch, the calculation of $R_{source}$ will return a small or negative value. If there is a fault in the upper circuit branch, the calculation of $R_{source}$ will return an excessively large value. Faults in the upper and/or lower circuit branch can thus be identified and the operation of the battery charger 114 altered accordingly.

Referring now to FIGS. 2, 3, 4 and 8, $R_{source}$ may be determined as indicated at 154. For example, the microprocessor 142 may calculate $R_{source}$ as explained above with reference to (18) through (21). As indicated at 156, it is determined whether $R_{source}$ is outside of its expected range. For example, the microprocessor 142 may determine whether $R_{source}$ is greater than 3Ω or less than 0Ω. While 3Ω represents a resistance that, when combined with the upper and lower resistances, can result in line to neutral voltages considered to be brown out conditions, lower values of resistance for $R_{source}$ can be used and may be more representative of an error free circuit. If yes, the operation of the battery charger 114 may be altered as indicated at 158. For example, the microprocessor 142 may reduce $i_{max}$ of (53), or discontinue the operation of the battery charger 114.

Referring now to FIGS. 2, 3, 4 and 9, it is determined whether $R_{source}$ is greater than its expected range as indicated at 160. For example, the microprocessor 142 may determine whether $R_{source}$ is greater than 3Ω. If no, it is determined whether $R_{source}$ is less than its lower threshold value as indicated at 162. For example, the microprocessor 142 may determine whether $R_{source}$ is less than −1Ω. (In this example, the threshold values are 1Ω outside of the boundaries of the expected range. Other schemes, however, may be used. As will be discussed below, if $R_{source}$ is between the threshold value and the boundary of the expected range, the charging output of the battery charger 114 will be reduced. If the magnitude of $R_{source}$ is greater than the magnitude of the threshold value, operation of the battery charger 114 will cease.) If yes, operation of the battery charger 114 is discontinued as indicated at 164. For example, the microprocessor 142 may discontinue charging the battery. If no, the output of the battery charger 114 is reduced as indicated at 166. For example, the microprocessor 142 may reduce $i_{max}$ of (53) proportionally to the difference between the value of $R_{source}$ and the boundary of the expected range. If $R_{source}$ is −0.5Ω and the boundary of the expected range is 0Ω, then the microprocessor may reduce $i_{max}$ of (53) by 50%.

Returning again to 160, if yes, it is determined whether $R_{source}$ is greater than its upper threshold value as indicated at 168. For example, the microprocessor 142 may determine whether $R_{source}$ is greater than +4Ω. (As explained above, the threshold values in this example are 1Ω outside that of the boundaries of the expected range.) If yes, operation of the battery charger 114 is discontinued as indicated at 164. If no, the output of the battery charger 114 is reduced as indicated at 166. For example, the microprocessor 142 may reduce $i_{max}$ of (53) proportionally to the difference between the value of $R_{source}$ and the boundary of the expected range. If $R_{source}$ is +3.7Ω and the boundary of the expected range is +3Ω, then the microprocessor may reduce $i_{max}$ of (53) by 70%.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A method for controlling, by a vehicle battery charger, an input current from an alternating current power distribution circuit including a power line and return line, the method comprising:

controlling an input current from the alternating current power distribution circuit based on a difference between parameters indicative of a resistance of the power line and parameters indicative of a resistance of the return line.

2. The method of claim 1 wherein controlling an input current from the alternating current power distribution circuit based on a difference between parameters indicative of a resistance of the power line and parameters indicative of a resistance of the return line includes reducing current flow from the distribution circuit if a magnitude of the current is greater than a first threshold value.

3. The method of claim 2 wherein controlling an input current from the alternating current power distribution circuit based on a difference between parameters indicative of a resistance of the power line and parameters indicative of a resistance of the return line includes stopping the current flow from the distribution circuit if the magnitude is greater than a second threshold value.

4. An automotive vehicle battery charger capable of receiving power from an alternating current power distribution circuit including a power line and return line, the battery charger comprising:

a controller disposed within a vehicle and configured to be electrically connected with the alternating current power distribution circuit and to control an input current from the distribution circuit based on a difference between parameters indicative of a resistance of the power line and parameters indicative of a resistance of the return line.

5. The battery charger of claim 4 wherein controlling current from the distribution circuit based on a difference between parameters indicative of a resistance of the power line and parameters indicative of a resistance of the return line includes reducing current flow from the distribution circuit if a magnitude of the current is greater than a first threshold value.

6. The battery charger of claim 4 wherein controlling an input current from the alternating current power distribution circuit based on a difference between parameters indicative of a resistance of the power line and parameters indicative of a resistance of the return line includes stopping the current flow from the distribution circuit if the magnitude is greater than a second threshold value.

7. A battery charger capable of (i) receiving power from an alternating current power distribution circuit including a power line and return line and (ii) transferring the power to a battery, the battery charger comprising:

controller circuitry configured to control an input current from the alternating current power distribution circuit based on a difference between parameters indicative of a resistance of the power line and parameters indicative of a resistance of the return line.

8. The battery charger of claim 7 wherein controlling an input current from the alternating current power distribution circuit based on a difference between parameters indicative of a resistance of the power line and parameters indicative of a resistance of the return line includes reducing current flow from the distribution circuit if a magnitude of the current is greater than a first threshold value.

9. The battery charger of claim 8 wherein controlling an input current from the alternating current power distribution circuit based on a difference between parameters indicative of a resistance of the power line and parameters indicative of a resistance of the return line includes stopping the current flow from the distribution circuit if the magnitude is greater than a second threshold value.

* * * * *